April 6, 1926.
C. S. GORDON
TOOL HANDLE
Filed April 29, 1924
1,579,307
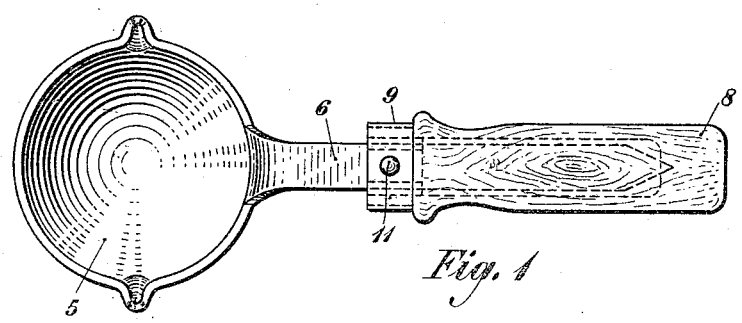
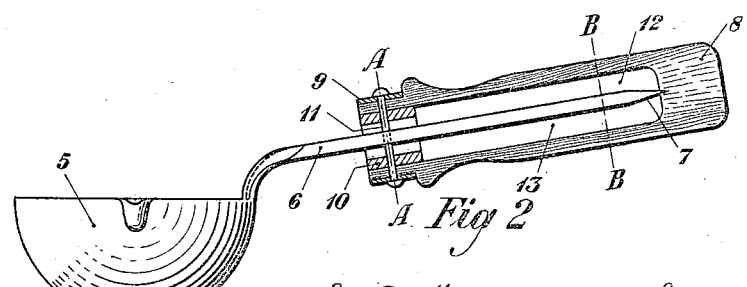
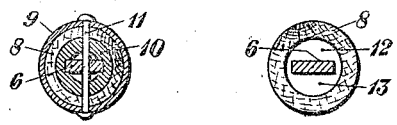
INVENTOR
C. S. Gordon
BY
ATTORNEY Patented Apr. 6, 1926.

1,579,307

UNITED STATES PATENT OFFICE.

CHESTER S. GORDON, OF NEW YORK, N. Y., ASSIGNOR TO AMERICAN TELEPHONE AND TELEGRAPH COMPANY, A CORPORATION OF NEW YORK.

TOOL HANDLE.

Application filed April 29, 1924. Serial No. 709,841.

*To all whom it may concern:*

Be it known that I, CHESTER S. GORDON, a citizen of the United States, residing at New York, in the county of New York and State of New York, have invented certain Improvements in Tool Handles, of which the following is a specification.

This invention relates to handles of the character used in connection with such heated tools as solder ladles, solder coppers, or similar types of tool, for the purpose of providing insulation from heat transmitted by these tools while they are being operated.

In accordance with this invention, a simple and comparatively inexpensive handle is provided, which accomplishes the above mentioned result in an effective and efficient manner.

The invention is shown by the accompanying drawing in which the handle is indicated as applied to a solder ladle for the purpose of illustration, although it will be understood that it may be equally well applied to other tools of like character.

In the drawing, Figure 1 is a top plan view of the improved device and an attached ladle; Fig. 2 is a side view thereof partly in section; Fig. 3 is a sectional view taken on the line A—A of Fig. 2; and Fig. 4 is an additional sectional view through line B—B of the same figure.

Referring to the drawing, the numeral 5 represents a ladle of customary design having a flat steel shank or tang 6 extending therefrom. The tang 6 is tapered and provided with a pointed end 7, which extends through the hollow section or chamber formed in the handle 8 and is driven into the solid end of said handle, thus firmly securing one end of the handle to the ladle. The handle 8 is preferably formed of a relatively poor heat conducting material, such as seasoned hard maple of circular cross-section, and its exterior is so fashioned that it provides a sure as well as an easy gripping surface. One end of the handle 8 has a steel ferrule 9 snugly fitted over its depressed portion, and interiorly thereof is provided a steel tube or collar 10 which extends into the chamber portion of the handle 8 for a short distance. In the present instance the collar 10 is shown as having two parallel interior slots which extend longitudinally thereof. When the tang 6 is driven into the handle 8 the edges of said tang engage these slots in a force fit and prevent any relative movement between the handle and ladle. It is pointed out that other means may be employed for this purpose, for example, the collar may be divided in halves with the edges of the tang interposed between the halves. After the ferrule 9 and collar 10 are in position, a rivet 11 is driven through apertures in these members and through an alined aperture in the tang 6, thus securely positioning the tang. When thus positioned, and with the pointed end 7 of the latter member driven into the solid portion of the handle 8, as previously described, a good balance is established for said handle and the ladle 5.

By positioning the tang 6 as above described, openings are formed between the collar 10 and each side of the tang through which air is admitted to the chamber comprising the open spaces 12 and 13 which extend longitudinally on either side of the tang. A free circulation of air is thus provided through the chamber, which dissipates and tends to prevent the transmission of excessive heat from the heated ladle and keeps the handle cool during the period while the ladle is being operated.

While the arrangements of this invention have been illustrated as embodied in a certain specific form, and applied to a certain type of implement, it will be understood that it is capable of embodiment in other forms and may be applied to a variety of other implements without departing from the spirit of the invention, as defined in the appended claim.

What is claimed is:

A handle formed of a relatively poor heat conducting material, a heat carrying implement having a flat metal tang extending therefrom and adapted to enter into and be attached to one end of said handle, a chamber formed interiorly of said handle and circumferentially of said tang, a collar affixed to one end of said tang having longitudinal slots in which the edges of the tang register, the dimensions of said collar and said tang being such that air-ducts are provided on either side of said tang to permit the entrance and free circulation of air into the interior chamber of the handle about the tang to dissipate heat transmitted from said implement, said tang, when in registered position in said slots, co-operating with the tang attached end of said handle to provide a good balance for said handle and implement and prevent relative movement thereof.

In testimony whereof, I have signed my name to this specification this 26th day of April 1924.

CHESTER S. GORDON.